United States Patent [19]

Beck et al.

[11] 4,334,038

[45] Jun. 8, 1982

[54] SHAPING OF PLASTIC MATERIALS CONTAINING POLYMERIC LUBRICANT

[75] Inventors: Heinz Beck, Duren; Karl H. Frassek, Langerwehe, both of Fed. Rep. of Germany; Egenius A. Giezen, BA Rheden; Eduard M. Verhulst, BA Zevenaar, both of Netherlands

[73] Assignee: Akzona Incorporated, Asheville, N.C.

[21] Appl. No.: 229,916

[22] Filed: Jan. 30, 1981

[30] Foreign Application Priority Data

Feb. 2, 1980 [DE] Fed. Rep. of Germany ....... 3003797

[51] Int. Cl.$^3$ .................... C08L 23/08; C08L 35/00; C08L 35/02

[52] U.S. Cl. ............................ 525/207; 525/222; 525/227

[58] Field of Search ................ 525/207, 222, 227

[56] References Cited

FOREIGN PATENT DOCUMENTS 2727329 4/1979 Fed. Rep. of Germany.

Primary Examiner—Carman J. Seccuro
Attorney, Agent, or Firm—F. W. Young; Daniel N. Christus

[57] ABSTRACT

This disclosure relates to a process for forming plastics from a melt of a mixture of plastics, stabilizers, antioxidants and lubricants, wherein the lubricants comprise a derivative of a copolymer of unsaturated polycarbonic acids or the anhydrides thereof and α-olefins having an average of at least 28 carbon atoms.

11 Claims, No Drawings

SHAPING OF PLASTIC MATERIALS CONTAINING POLYMERIC LUBRICANT

The invention relates to a process for shaping plastic materials, whereby a molded body is produced from a melt of a mixture comprising plastics, stabilizers and/or antioxidants, pigments and/or fillers if required, flowing agents and lubricants.

German patent application No. 27 27 329 describes olefin maleic acid copolymer derivatives and their use as lubricants for shaping processing of plastics. Such lubricants are made up from olefins having an average of from 2 to 24 carbon atoms, and maleic acid, or its anhydride. These lubricants produce a lowering of the melt viscosity and therefore are referred to more or less as so-called "internal lubricants". Such lubricants have relatively short gelation times as measured using a "Brabender Plasticorder". Also, the degree of adhesion to the wall of the shaping device, for plastics containing such lubricants, is relatively high. As a result, the formulation range, in particular for compositions containing tribasic lead sulfate for the stabilization of the plastic material, is narrowed. The term "formulation range" refers to the range over which the composition of the plastic mixture to be shaped may be adjusted, especially with respect to the lubricant and/or stabilizer quantities.

An object of the present invention is to provide a process for shaping plastics, employing a lubricant considerably stronger in its external lubricating effect than customary lubricants, without any loss of internal lubricating effect, and which permits a wider formulation range.

The present invention provides a process for shaping plastic which utilizes a lubricant comprising a derivative of a copolymer of an unsaturated polycarboxylic acid, or its anhydride, with α-olefins having an average carbon number of at least 28 carbon atoms.

α-Olefins having an average carbon number of at least 28 carbon atoms are mixtures containing only a small proportion of shorter-chain-olefins. The main constituent of such α-olefins contains α-olefins having a carbon number fluctuating within a narrow range around the indicated average carbon number. A typical example is a $C_{30+}$-α-olefin, the gas-chromatographic analysis of which shows the following composition:

$C_{26}$ = 4.7%
$C_{28}$ = 14.5%
$C_{30}$ = 18.3%
$C_{32}$ = 15.2%
$C_{34}$ = 11.7%
$C_{36}$ = 9.3%
$C_{38}$ = 7.5%
$C_{40}$ = 6.0%
$C_{42}$ = 4.9%
$C_{44}$ = 4.1%
$C_{46}$ = 2.9%

Internal lubricants lower the melt viscosity, as shown by measurements in a "Brabender Plasticorder", in which a lower force is needed. External lubricants increase the gelation time and reduce the adhesion of the plastic material to the wall.

It is well known that with polyethylene waxes, an increase in carbon number produces a decline in their external lubricating effects. Therefore, it may be assumed, that copolymer derivatives of unsaturated polycarboxylic acids and α-olefins having more than 24 carbon atoms would not produce satisfactory lubricating effects, and in particular satisfactory external lubricating effects. Thus, it is surprising that the lubricants of the present invention containing α-olefins having a higher carbon number produce considerably increased gelation times as measured in a "Brabender Plasticorder".

Preferably, copolymers employed as lubricants in the process of the present invention, are esterified with a monofunctional alcohol. For best results it is more preferred that the esterification is carried out with a monofunctional alcohol having from 2 to 26 carbon atoms. It has been found that, when lead stabilizers are employed, the external lubricating effect of the copolymer derivatives increases with an increasing chain length of the alcohol component of the ester. When tin stabilizers are used, this effect is not as unequivocally recognizable.

In general, esterification should be continued until at least a monoester is produced. However, it is more advantageous, if the copolyester is esterified to such an extent, that it has at least partially been esterified to a diester.

In accordance with the process of the present invention good results are obtained for copolymers where the molar ratio of unsaturated polycarboxylic acid, or anhydride to α-olefin is in a range of from 0.5:1 to 2.0:1.

Representative of the unsaturated polycarboxylic acids employed in the present invention include, for example, fumaric acid, citraconic acid, mesaconic acid or itaconic acid, or their anhydrides. However, due to ease of accessibility, maleic acid, or maleic anhydride, are preferred within the framework of the present invention. In addition, mixtures of different unsaturated polycarboxylic acids, or anhydride mixtures also produce lubricants with increased external lubricating effect when they are copolymerized with olefins.

The average molecular weight of the unesterified copolymers is between 1,300 and 100,000, and preferably between 5,000 to 30,000. At higher molecular weights, the copolymers themselves are generally considered plastic materials with respect to their characteristics and as a result their effectiveness as lubricants has been greatly diminished.

The average molecular weight of the unesterified copolymers is determined employing a gel permeation-chromatographic method. This method utilizes a chromatographic technique employing high pressure separation, in which a mixture is broken down with respect to the molecular weight of its components.

In accordance with the process of the present invention it is preferred that the lubricant is premixed with stabilizers and/or antioxidants, pigments and/or fillers if required, as well as flowing agents. This mixture can advantageously be prepared in a melted state.

The process of the present invention is further illustrated by the following examples:

EXAMPLE I—Preparation of the Copolymers a. Copolymerization of Maleic Anhydride and $C_{30+}$-α-olefin.

Under a nitrogen atmosphere, 420 g of a $C_{30+}$-α-olefin and 5 g of butyl acetate are placed in a reactor, at a temperature of 200° C. To the reaction mixture is added 10 portions of a mixture at 30 minute intervals wherein each portion contains 9.8 g of maleic anhydride and 1 ml of di-t-butyl peroxide. Following completion of the addition of maleic anhydride-di-t-butylperoxide mixture the reaction mixture is heated at a temperature of 200°

C. for one hour. The resulting polymer exhibits a wide molecular weight distribution with an average molecular weight of 5,000. At lower temperatures higher average molecular weights are obtained, e.g. at 140° C. average molecular weights of from 30,000 to 40,000 are obtained.

The resulting copolymers are then heated at a temperature of from 120° C. to 160° C. in the presence of one mole of an alcohol, e.g. methanol, butanol, cyclohexanol, 2-ethyl hexanol, tallow alcohol, etc., per mole of anhydride. The resulting mixture is maintained at within this temperature range for a period of from 30 to 60 minutes and as a result is esterified to a monoester.

When the above copolymers are mixed with 2 moles of an alcohol, e.g. tallow alcohol, per mol of anhydride, and 0.02 moles of p-toluene sulfonic acid are then added, and the reaction mixture is heated to a temperature of 150° C. to 160° C., the corresponding diester of the copolymer is obtained. Any water produced is removed with a water-jet vacuum pump. An acid number of 5 to 8 is reached within 2 hours.

b. Copolymerization of $C_{30+}$-$\alpha$-olefin with Maleic Esters (Fumaric Esters)

Under a nitrogen atmosphere 420 g of a $C_{30+}$-$\alpha$-olefin are heated to 200° C. with 228 g of maleic di-butyl ester, in a reaction vessel. To the reaction is added 11 one ml. portions of di-t-butyl peroxide at 30 minute intervals. Thirty minutes after the last addition, the heating of the reaction mixture is interrupted and the volatile decomposition products of the peroxide are distilled off. Gel permeation-chromatographic analysis shows a wide molecular weight distribution with an average molecular weight of 2,500 (calibrating substance: polystyrene).

The results are compiled in Table I, with the lubricants designated as follows:

COMMERCIAL PRODUCTS

I—ethylene glycol ester of montanic acid
II—60% montanic butanediolester and 40% montanic acid calcium soap
III—polyethylene wax MW 2000
IV—polyethylene wax MW 3000
V—hydrated sperm oil

COMPARISON PRODUCT

VI $C_{20}$-$\alpha$-olefin maleic acid ditallow ester copolymer

LUBRICANTS OF THE PRESENT INVENTION

A—$C_{30+}$-$\alpha$-olefin maleic anhydride copolymer
B—$C_{30+}$-$\alpha$-olefin maleic monomethyl ester copolymer
C—$C_{30+}$-$\alpha$-olefin maleic 2-ethylhexyl monoester copolymer
D—$C_{30+}$-$\alpha$-olefin maleic acid tallow diester copolymer The following conditions were maintained for the "Brabender Plasticorder":

| Temperature | 170° C. |
|---|---|
| velocity | 30 rpm |
| specimen weight | 33.5 g |

Table I shows the results obtained with respect to gelation time, torsional moment during gelation, gelation temperature, torsional moment 10 minutes after gelation and temperature 10 minutes after gelation.

TABLE 1

| Lubricant | Quantity (parts by wt.) | Gelation time (min.) | Torsional moment during gelation (m.g.) | Temperature at gelation (C.°) | Torsional moment 10 min. after gelation (m.g.) | Temperature 10 min. after gelation (C.°) |
|---|---|---|---|---|---|---|
| I | 0.3 | 3.0 | 2450 | 168 | 2500 | 177 |
|   | 0.5 | 4.2 | 2400 | 170 | 2500 | 177 |
| II | 0.3 | 2.5 | 2400 | 166 | 2550 | 177 |
|   | 0.5 | 4.2 | 2400 | 168 | 2600 | 177 |
| III | 0.3 | 2.4 | 2375 | 165 | 2650 | 178 |
|   | 0.5 | 2.7 | 2375 | 168 | 2650 | 178 |
| IV | 0.3 | 2.3 | 2350 | 166 | 2650 | 178 |
|   | 0.5 | 2.7 | 2300 | 167 | 2625 | 178 |
| V | 0.3 | 2.0 | 2475 | 165 | 2700 | 177 |
|   | 0.5 | 2.5 | 2475 | 167 | 2700 | 177 |
| VI | 0.3 | 2.5 | 2400 | 165 | 2675 | 177 |
|   | 0.5 | 3.6 | 2400 | 167 | 2700 | 177 |
| A | 0.3 | 1.5 | 2400 | 165 | 2600 | 177 |
|   | 0.5 | 3.3 | 2550 | 170 | 2600 | 177 |
| B | 0.3 | 1.5 | 2400 | 164 | 2700 | 177 |
|   | 0.5 | 3.8 | 2550 | 170 | 2650 | 177 |
| C | 0.3 | 2.9 | 2400 | 167 | 2500 | 176 |
|   | 0.5 | 8.2 | 2400 | 170 | 2500 | 176 |
| D | 0.3 | 4.5 | 2500 | 170 | 2650 | 178 |
|   | 0.5 | 25.0 | 2200 | 171 | 2400 | 175 |

EXAMPLE 2—Testing of the Copolymers for Lubricating Effect with Lead Stabilizers.

The behavior of a plastic mass during shaping from a melt are evaluated by means of measurements in a "Brabender Plasticorder". The following, is a description of such measurements, which were performed with plastic masses consisting of 100 parts by weight of suspension PVC, 2 parts by weight of tribasic lead sulfate, and either 0.3 or 0.5 parts by weight of a lubricant. For comparison purposes, a number of commercially available lubricants was investigated in the same manner.

EXAMPLE 3—Determination of the Decomposition Behavior with Lead Stabilizers

In order to determine the influence of lubricants on the thermal stability under dynamic conditions, various PVC mixtures were measured to determine point of time of the increase in torsional moment in a Brabender Plasticorder. The mixtures consisted of 100 parts by weight of PVC suspension polymer, 1.5 parts by weight tribasic lead sulfate, 0.5 parts by weight lead stearate, and 0.3 parts by weight of various lubricants listed in Example 2. The determinations were carried out at a temperature of 180° C. and a velocity of 75 rpm. The specimen weight was 33.5 g. The results obtained are compiled in Table 2.

TABLE 2

| Lubricant | Point of time of increase in torsional moment (min.) |
|---|---|
| * | 14.8 |
| I | 12.8 |
| VI | 12.4 |
| C | 16.0 |
| D | 15.6 |

*no lubricant was employed

EXAMPLE 4—Examination of the Copolymers for Lubricating Effect with Organotin Stabilizers.

As in Example 2, a mixture consisting of 100 parts by weight of PVC suspension polymer, 2 parts of weight of di-($\beta$-carbobutoxyethyl) tin-bis-isooctyl thioglycolate and 0.3 to 0.5 parts by weight of a lubricant was tested in a "Brabender Plasticorder" at a temperature of 160° C. and 30 rpm, with a specimen weight of 32.5 g. The results obtained are compiled in Table 3. Lubricant VII, which was utilized in lieu of lubricant IV, is polyethylene having a molecular weight of 9000.

TABLE 3

| Lubricant | Quantity (parts by wt.) | Gelation time (min.) | Torsional moment during gelation (m.g.) | Temperature at gelation (C.°) | Torsional moment 10 min. after gelation (m.g.) | Temperature 10 min. after gelation (C.°) |
|---|---|---|---|---|---|---|
| I | 0.3 | 2.4 | 2600 | 159 | 2950 | 169 |
|  | 0.5 | 5.3 | 2575 | 163 | 2900 | 170 |
| II | 0.3 | 2.3 | 2550 | 159 | 2850 | 169 |
|  | 0.5 | 4.7 | 2450 | 161 | 2900 | 169 |
| III | 0.3 | 3.6 | 2600 | 163 | 2900 | 171 |
|  | 0.5 | 4.5 | 2450 | 163 | 2850 | 171 |
| VII | 0.3 | 2.8 | 2600 | 162 | 2900 | 170 |
|  | 0.5 | 3.5 | 2550 | 163 | 2850 | 170 |
| V | 0.5 | <1 | — | — | 2900 | 169 |
| A | 0.3 | 2.9 | 2550 | 163 | 2800 | 171 |
|  | 0.5 | 6.4 | 2500 | 164 | 2825 | 169 |
| B | 0.3 | 3.2 | 2700 | 163 | 2800 | 171 |
|  | 0.5 | 6.0 | 2575 | 165 | 2775 | 169 |
| C | 0.3 | 5.0 | 2600 | 163 | 2825 | 169 |
|  | 0.5 | 7.5 | 2450 | 163 | 2800 | 169 |
| D | 0.3 | 4.0 | 2575 | 161 | 2925 | 169 |
|  | 0.5 | 6.7 | 2450 | 161 | 2850 | 169 |

EXAMPLE 5—Determination of Degradation behavior with Organotin Stabilizers

Under conditions similar to those employed in Example 3 (temperature 180° C., velocity of 75 rpm and a specimen weight of 32.5 g ), a mixture of 100 parts by weight of PVC, 2 parts by weight of di-($\beta$-carbobutoxyethyl) tin-bis-isooctyl thioglycolate and 0.5 parts by weight of lubricants was measured to determine the point of time of the increase in torsional moment in a "Brabender Plasticorder". The results obtained are compiled in Table 4.

TABLE 4

| Lubricant | Point of time of increase in torsional moment (min.) |
|---|---|
| * | 11.2 |
| I | 14.0 |
| VI | 13.9 |
| C | 17.2 |
| D | 13.9 |

*no lubricant was employed

Longer gelation times, or greater differences between gelation times at a certain interval of two quantity components of a lubricant in a "Brabender Plasticorder", indicate a greater formulation range. The above examples illustrate that the use of maleic $\alpha$-olefin derivatives having an average carbon number of at least 28 carbon atoms in lubricants increases the formulation range. The examples also show, that these lubricants have a pronounced effect as external lubricants and, in particular in combination with lead stabilizers, resulting in favorable processing conditions for shaping from a melt. The measurements of the degradation behavior illustrate, that, when compared with known lubricants, the lubricants employed in the processes of the present invention produce a distinct increase in stability when the same stabilizers and stabilizer quantities are utilized.

What is claimed is:

1. A process for shaping plastic materials, wherein a molded body is produced from a melt of a mixture comprising a plastic material, stabilizers and/or antioxidants, pigments and/or fillers, flowing agents and a lubricant, wherein the lubricants comprise a copolymer of unsaturated polycarboxylic acids, or anhydrides thereof, and $\alpha$-olefins having an average carbon number of at least 28 carbon atoms.

2. A process according to claim 1, wherein the copolymer derivative is esterified with a monofunctional alcohol.

3. A process according to claim 2, wherein the copolymer derivative is esterified with a monofunctional alcohol having from 2 to 26 carbon atoms.

4. A process according to claim 3, wherein the copolymer derivative is esterified to a monoester.

5. A process according to claim 3, wherein the copolymer derivative is at least partially esterified to a diester.

6. A process according to claim 1 wherein the molar ratio of unsaturated polycarboxylic acid to $\alpha$-olefin is in a range of from 0.5:1 to 2.0:1.

7. A process according to claim 1, wherein the unsaturated polycarboxylic acid or anhydride is maleic acid or maleic anhydride.

8. A process according to claim 1, wherein the average molecular weight of the unesterified copolymer derivative is from 1,300 to 100,000.

9. A process according to claim 8, wherein the molecular weight is from 5,000 to 30,000.

10. A process according to claim 1, wherein the lubricant is mixed with stabilizers and/or antioxidants, pigments and/or fillers and flowing agents prior to formulation with a plastic material.

11. A process according to claim 10, wherein the mixture of lubricant stabilizers and/or antioxidants, pigments and/or fillers and flowing agents is prepared in a melted state.

* * * * *